United States Patent [19]

Kelman

[11] Patent Number: 5,005,887
[45] Date of Patent: Apr. 9, 1991

[54] ENERGY ABSORBING BUMPER FASTENER SYSTEM

[75] Inventor: Josh Kelman, Dover, N.H.
[73] Assignee: Davidson Textron Inc., Dover, N.H.
[21] Appl. No.: 506,160
[22] Filed: Apr. 9, 1990
[51] Int. Cl.⁵ ............................................. B60R 19/24
[52] U.S. Cl. .................................. 293/120; 293/109; 293/155
[58] Field of Search ............... 293/154, 155, 120, 121, 293/122, 109, 136, 102, 107

[56] References Cited

U.S. PATENT DOCUMENTS

| | | | |
|---|---|---|---|
| 3,488,077 | 1/1970 | Miller | 298/38 X |
| 3,493,257 | 2/1970 | Fitzgerald et al. | 293/120 |
| 3,494,607 | 2/1970 | Rusch | 293/109 X |
| 3,608,943 | 9/1971 | Gostomski | 293/155 X |
| 4,070,052 | 1/1978 | Ng | 293/120 X |
| 4,116,893 | 9/1978 | Flanagan | 293/109 X |
| 4,339,144 | 7/1982 | Nagasaka | 293/120 |
| 4,350,378 | 9/1982 | Wakamatsu | 293/120 |
| 4,457,547 | 7/1984 | Sekiyama et al. | 293/120 X |
| 4,509,782 | 4/1985 | Manning | 293/109 X |
| 4,598,001 | 7/1986 | Watanabe et al. | 293/109 X |
| 4,830,418 | 5/1989 | Lest | 293/155 X |
| 4,929,008 | 5/1990 | Esfandiary | 293/120 X |

FOREIGN PATENT DOCUMENTS 49614  4/1982  European Pat. Off. ............ 293/136

Primary Examiner—Margaret A. Focarino
Assistant Examiner—Joseph D. Pape
Attorney, Agent, or Firm—John C. Evans

[57] ABSTRACT

A bumper fastening system for a composite SRIM (structural reaction injected molded) member made up of a core member covered by a reinforced outer cover has a fastening cup connected to the reinforced outer cover by a layer of adhesive material. The fastening cup is a hollow rectangle with a flat end plate which is covered by a layer of adhesive for connection to the composite SRIM or to a metal bumper by spot welds. The hollow rectangle has a depth which will engage it with crush convolutions on frame rails of a vehicle frame. Mating holes in the hollow rectangle and the side rails receive mechanical fasteners for removably attaching the bumper assembly on the frame rails during installation at the automobile assembly plant and for replacement/repair of a damaged bumper.

10 Claims, 1 Drawing Sheet

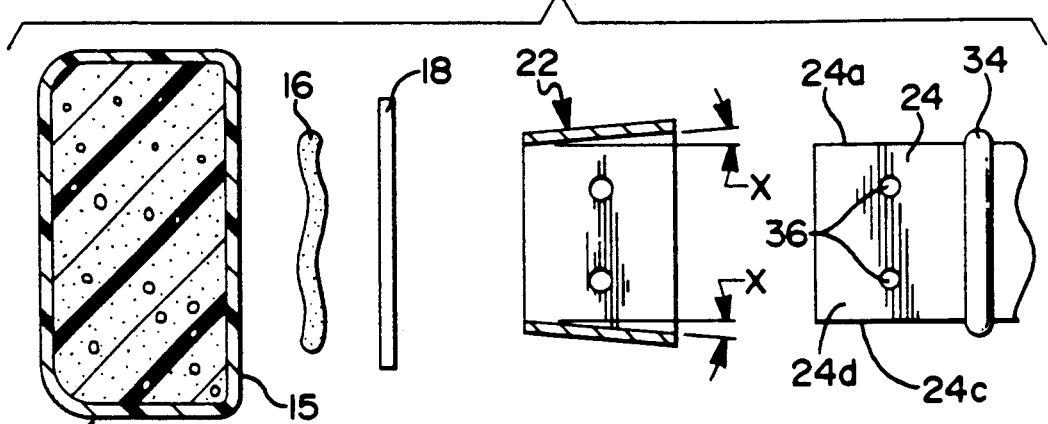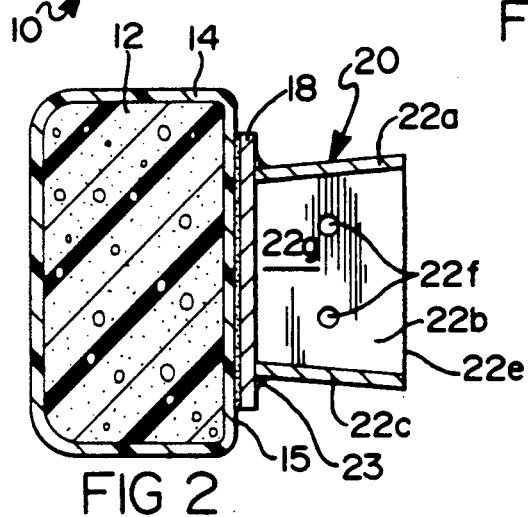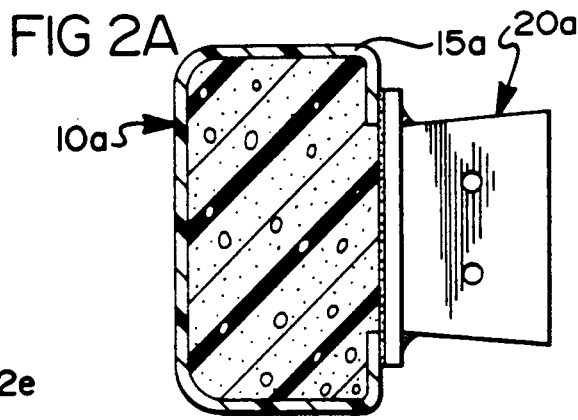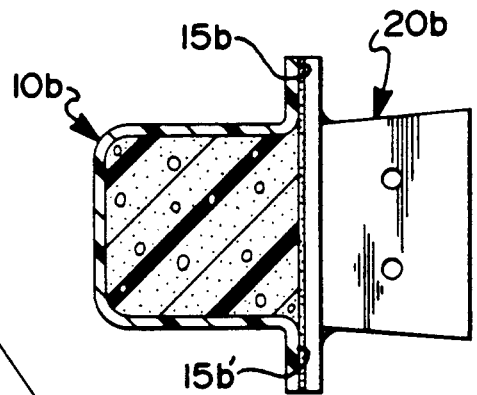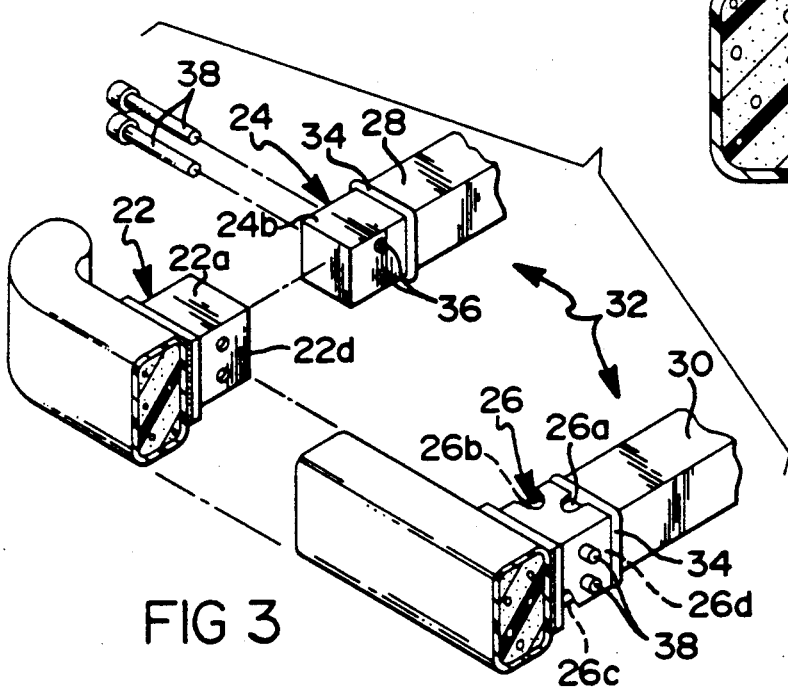

ENERGY ABSORBING BUMPER FASTENER SYSTEM

TECHNICAL FIELD

This invention relates to bumper assemblies and more particularly to bumper fastening systems for connecting bumpers to frame rails of a vehicle for ease of installation and repair.

BACKGROUND OF THE INVENTION

Various proposals have been suggested to slidably mount a bumper onto the frame rails of a vehicle frame. It is also to connect vehicle frame rails directly to plates embedded in a bumper including energy absorbing material. In yet other systems a energy damper is connected to a support beam of a bumper by a retention system in which a cross bolt is used to connect the damper to a retention flange carried within a hollow segment of the bumper support beam.

Examples of the aforesaid systems are shown in U.S. Pat. Nos. 3,374,554; 4,460,205; 4,460,206 and 4,762,352.

U.S. Pat. Nos. 4,254,978 and 4,413,856 and the aforesaid U.S. Pat. No. 4,762,352 further disclose the attachment of a bumper to frame rails by use of connecting fasteners between a bumper reinforcing plate and an end plate on the frame rails.

While each of the aforedescribed proposals are suitable for their intended purpose they do not provide a fastening system suitable for connecting a generic bumper of either the plastic energy absorbing type or metal bumpers to frame rails during factory installation and/or for replacement or repair.

SUMMARY OF THE INVENTION

In accordance with the present invention a bumper fastening system is provided having a fastening member configured for sliding installation on a frame rails of a vehicle and including provision for connection of the fastening member to a smooth outer surface of the bumper without requiring use of separate fastening bolts and nuts.

A feature of the present invention is a fastening cup with a multiplicity of flat surfaces fully juxtaposed against all surface portions of the frame rails of a vehicle frame for capturing the frame rails and wherein the fastening cup has a flat plate end surface for connection to a flat surface portion of either a reinforced composite energy absorbing bumper or to a flat surface portion of a metal bumper so as to reduce stress levels at the point of attachment between the fastening cup and the bumper.

Yet another feature of the present invention is to provide such a fastening cup which is configured to have a 3-5 degree draft for on-line assembly of the fastening cups and attached bumper to the frame rails of a vehicle.

An object of the present invention is to simplify the manufacture and repair of bumper fastening systems wherein the fastening systems are connected to the bumper without requiring separate bolt and nut fasteners and wherein the fastening systems include hollow rectangular fastening cups which evenly divide the load distribution from the bumper to frame rails and which include a flat end plate the reinforces the fastening system to manage transverse loading on the vehicle frame rails.

A further object of the invention is to provide such bumper fastening systems wherein the fastening cups each having flat surface portions each fully juxtaposed against free ends of the frame rails for resisting frame rail bending and for distributing load from the bumper to the frame rails.

A further object of the present invention is to provide adhesive means for bonding the flat face to the bumper for integrally bonding the fastening cups to the bumper.

Still another object of the present invention is to provide a bumper assembly in which fastening cups are provided with a flat face and a cup-shaped extension thereon with draft angles thereon selected to slidably connect to frame rails of a vehicle frame during on-line assembly of the bumper to the vehicle frame.

Yet another object of the invention is to provide an energy absorbing bumper assembly having a core of energy absorbing foam and a box frame surrounding the core for connection to the free ends of frame rails of a vehicle characterized by having a frame connecting member integrally formed on the box frame for slidably connecting the energy absorbing bumper assembly on frame rails.

BRIEF DESCRIPTION OF THE DRAWINGS

Other advantages of the resent invention will be readily appreciated as the same becomes better understood by reference to the following detailed description when considered in connection with the accompanying drawings wherein:

FIG. 1 is an exploded view of component parts of the present invention;

FIG. 2 is a sectional view of a bumper and fastening cup of the present invention;

FIG. 2A is a sectional view of a second embodiment;

FIG. 2B is a sectional view of a third embodiment; and

FIG. 3 is a somewhat schematic perspective view partially exploded and partially assembled and sectioned of a bumper and fastening cup assembly before and after assembly to frame rails of a vehicle frame.

DETAILED DESCRIPTION OF THE INVENTION

Referring now to FIG. 1, a SRIM (structural reaction injected molded) bumper 10 is shown in cross-section. It includes a core member 12 of energy absorbing foam material covered by an outer layer sheath 14 of reinforcing material.

The bumper 10 has a generally flat inboard surface 15 which is bonded by a layer 16 of adhesive to a flat end plate 18 of a fastening cup or frame mount 20. In the embodiment of FIG. 2A, an inboard surface 15a of a bumper 10a is formed with an open section. In the embodiment of FIG. 2B, an inboard surface 15b is formed with an open section and projecting flanges 15b.

The fastening cup 20 further includes a hollow rectangular support member 22 with side walls 22a-22d connected by a fillet weld 23 to the flat end plate 18. The rectangular support member 22 is adapted to be located in juxtaposed relationship with the end of structural members of a vehicle frame to be described.

The core member 12 is formed from a suitable microcellular foam material of the type set forth in U.S. Pat. Nos. 3,161,436 and 3,575,896 having a common assignee, with it being understood that any other like material could be used to form the core member 12. The outer layer 14 can be a reinforced shell formed from high strength fibers including carbon, aramid, polyester, or glass fibers injected with a suitable reaction injection molded resin such as polyurethane, polyamide plastics, polyester, nylon, polypropylene, epoxy, acrylic or liquid thermoplastic materials. Alternatively, the outer layer 14 can be formed from a high strength RIM material as set forth in U.S. Pat. No. 4,426,348, commonly assigned.

While the invention in one aspect contemplates the formation of a unitary composite plastic bumper having fastener cups bonded integrally thereto, it also contemplates an arrangement wherein the fastening cups 20 are spot welded on a metal bumper having a flat inboard surface corresponding to flat inboard surface 16 of bumper 10.

The fastening cups 20 have a hollow rectangular support member 22 connected at its outboard end to the bumper 10 and having an axially directed opening 22g therein for receiving the ends 24, 26 of the frame rails 28, 30. The member 22 has walls 22a-22c formed at a draft angle X of from 3 to 5 degrees as shown exaggerated in FIG. 1. Such a draft angle on the walls 22a-22c enables the fastening cups 20 and bonded bumper 10 to be easily slipped as a unitary member during assembly of the bumper 10 onto a vehicle frame 32 during automobile assembly.

The fastening cup 20 is preferably a steel fabrication having four walls to form a hollow rectangular receptacle for capturing the ends 24, 26 of frame rails 28, 30 of a vehicle frame 32. The hollow configuration and the aforedescribed draft angle enable the fastening cups 20 to easily slip onto the vehicle frame during automobile assembly. The hollow rectangular support member 22 has a depth such that the end edges 22e of the side walls 22a-22b stop against a frame rail crush ridge 34 formed in the frame rails 28, 30. The frame rail ends 24, 26 each have through holes 36 which are aligned with through holes 22f formed in the side walls 22b and 22d of each of the support members 22. The mating holes 36 and 22f (shown as two vertically aligned holes) are configured to accept either pins 38 or other like removable mechanical fasteners when the bumper 10 is assembled to the frame 32. Once assembled the inside surface of each of the side walls 22a-22d is juxtaposed against the side surfaces 24a-24d and side surfaces 26a-26d of the rail ends 24, 26 respectively. Such full wall support evens load distribution from spaced, fastening cups 20 mounted on either side of the flat inboard surface 10a of the bumper 10.

The adhesive layer 16 provides a large mating surface area between the bumper 10 and the fastening cup 20. As a consequence stress levels at the attachment between the bumper 16 and the vehicle frame 32 are reduced.

The provision of a box-configured fastening cup 20 simplifies the frame rail design since the walls 22a-22d of the fastening cup 20 double the metal thickness at the frame rail ends 24 26 and consequently the frame rails 28, 30 do not need to be fabricated with a flange to provide a double wall thickness therein.

The juxtaposed connection between the walls 22a-22d and the side surfaces 24a-26d and 26a-26d will resist frame rail bending to assure a straight axial load flow path from the bumper 10 to the frame 32. The frame rails have no protrudant flanges which will distribute loading unevenly to the four sides of the rectangle defined by the rectangular support member 22.

The arrangement also serves to simplify repair of a bumper 10 since only pins 38 must be removed to slide the bumper 10 from the frame 32. There is no need to separate the bumper 10 at the adhesive joint (or spot weld joint in the case of a metal bumper 10) in order to separate it from the vehicle for repair or replacement.

In some bumper and front end designs loading imposed on the bumper produces a load component in a direction perpendicular to the cross-section of the frame rails 28, 30. The load component tends to laterally separate the rails 28, 30 from one another which in turn will cause increased unit loads on the inside rectangle face. The fastening cup 20 has its flat end plate 18 arranged to reinforce the cup 20 to more evenly assume and attenuate such loading on the frame rails 28, 30 and on the fastening cups 20.

The bumper 10 and fastening cups 20 connected thereto are equally suitable for use in either front or rear vehicle applications.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. An energy absorbing bumper assembly for attachment to spaced frame rails of a motor vehicle, the spaced frame rails each having a rail end with an end surface and polygonal side surfaces formed generally perpendicular to said end surface, the assembly including a bumper extending as a bridge across the spaced frame rails, the bumper including a core of energy absorbing material and a high strength outer sheath with a flat inboard surface carrying a frame mount characterized by:

said frame mount being a pair of spaced fastening cups each having interconnected side walls to form an axial opening with an axial open end for receiving said ends of said spaced frame rails; said fastening cups each further having a multiplicity of flat surface portions each located against the polygonal side surfaces of said rail end; said polygonal side surfaces and said interconnected side walls being juxtaposed to form a double wall thickness therebetween at each of said polygonal side surfaces for resisting frame rail bending and for distributing loads from said outer sheath to the spaced frame rails.

2. The energy absorbing bumper assembly of claim 1, further characterized by said flat inboard surface of said bumper being an open section.

3. The energy absorbing bumper assembly of claim 1, further characterized by said flat inboard surface of said bumper being an open section with projecting flanges.

4. The assembly as set forth in claim 1 wherein said outer sheath has an inner cavity with rigid core material contained therein.

5. The assembly as set forth in claim 1 wherein said outer shell is a high strength plastic material.

6. The assembly as set forth in claim 1 wherein said outer shell is a high strength plastic material in a layer of high strength fibers.

7. The energy absorbing bumper assembly as set forth in claim 1 wherein said fibers are selected from the group consisting of fibers of carbon, polyester, aramid or glass.

8. The energy absorbing bumper assembly as set forth in claim 1 wherein said plastic material is selected from the group consisting of polyester, polyurethane, nylon, polyamide plastics, acrylic plastic or liquid thermoplastic materials.

9. The energy absorbing bumper assembly as set forth in claim 1 wherein said plastic material is selected from the group consisting of polyester, polyurethane, polyamide, epoxy plastic, acrylic plastic or thermoplastic material.

10. The energy absorbing bumper assembly of claim 1 further characterized by said pair of fastening cups having interconnected side walls with flat surface portions continuously inclined from said axial open end to said bumper for defining a draft angle between said fastening cups and said ends of said frame rails when assembled thereon.

* * * * *